United States Patent [19]
Dvornic et al.

[11] Patent Number: 5,902,863
[45] Date of Patent: May 11, 1999

[54] DENDRIMER-BASED NETWORKS CONTAINING LYOPHILIC ORGANOSILICON AND HYDROPHILIC POLYAMIDOAMINE NANOSCOPIC DOMAINS

[75] Inventors: Petar R. Dvornic; Agnes M. deLeuze-Jallouli; Michael James Owen, all of Midland; Susan Victoria Perz, Essexville, all of Mich.

[73] Assignees: Dow Corning Corporation; Michigan Molecular Institute, both of Midland, Mich.

[21] Appl. No.: 08/897,943

[22] Filed: Jul. 21, 1997

[51] Int. Cl.$^6$ ................................................ C08L 77/02
[52] U.S. Cl. ...................... 525/431; 525/420; 525/540; 525/477
[58] Field of Search .................. 525/540, 420, 525/431, 477

[56] References Cited

U.S. PATENT DOCUMENTS

| | | | |
|---|---|---|---|
| 4,568,737 | 2/1986 | Tomalia | 528/332 |
| 4,713,975 | 12/1987 | Tomalia | 73/865 |
| 4,737,550 | 4/1988 | Tomalia | 525/418 |
| 5,387,617 | 2/1995 | Hedstrand | 521/79 |
| 5,393,795 | 2/1995 | Hedstrand | 521/134 |
| 5,393,797 | 2/1995 | Hedstrand | 521/134 |
| 5,560,929 | 10/1996 | Hedstrand | 424/486 |
| 5,739,218 | 4/1998 | Dvornic et al. | 525/487 |

OTHER PUBLICATIONS

P.R. Dvornic and D.A. Tomalia, "Molecules that Grow Like Trees. Dendritic Polymers: The Fourth Major Class of Macromolecular Architecture", Science Spectra, No. 5, pp. 36–41, (1996).

P.R. Dvornic and D.A. Tomalia, "Dendritic Polymers, Divergent Synthesis (Starburst (R) Polyamidamine Dendrimers)", in "The Polymeric Materials Encyclopedia", J.C. Salamone, ED., CRC Press Inc., Boca Raton, vol. 3, pp. 1814–1830, (1996).

P.R. Dvornic and D.A. Tomalia, "Recent Advances in Dendritic Polymers", Current Opinion in Colloid and Interface Science, vol. 1, Issue 2, pp. 221–235.

P.R. Dvornic, "Some Recent Advances in the Silicon Containing Polymers", Materials Science Forum, vol. 214, pp. 131–138, (1996).

I. Gitsov, K. Wooley, C.J. Hawker, P.T. Ivanova and J.M. Frechet, Macromolecules, 26, pp. 5621–5627, (1993).

T.M. Chapman, G. Hillyer, E.J. Mahan and K.A. Shaffer, J. Amer. Chem. Soc., 116, pp. 11195–11196, (1994).

T.M. Chapman and E.J. Mahan, Polymer Preprints, 73, pp. 275–276, (1995).

E.J. Mahan and T.M. Chapman, Polymer Preprints, 37(2), p. 247, (1996).

(List continued on next page.)

Primary Examiner—Robert Dawson
Assistant Examiner—Caixia Lu Rutt
Attorney, Agent, or Firm—James L. De Cesare

[57] ABSTRACT

Dendrimer-based networks are prepared from copolydendrimer precursors having well defined hydrophilic polyamidoamine (PAMAM) or polypropyleneimine (PPI) interiors, and organosilicon outer layers ending with $\equiv$Si—OCH$_3$ surface groups. These networks have precisely controllable size, shape, and spatial distribution, of nanoscopic hydrophilic and hydrophobic domains. Such constructs are prepared by crosslinking one type of copolydendrimer precursor, or by crosslinking mixtures of different copolydendrimers having different generations of PAMAM or PPI dendrimers in the interior, surrounded by different organosilicon exteriors. Crosslinking can be controlled by adding difunctional, trifunctional, or polyfunctional low molecular weight or oligomeric crosslinking agents; or by exposing a copolydendrimer having hydrolyzable surface groups to atmospheric moisture. Elastomeric dendrimer-based networks have low glass temperatures of –15° C. or below, are optically clear, transparent, colorless; and have a non-stick surface which can be formed into films of small thickness.

19 Claims, 3 Drawing Sheets

OTHER PUBLICATIONS

K. Lorenz, R. Mulhaupt, H. Frey, U. Rapp and F.J. Mayer–Posner, Macromolecules, 28, pp. 6657–6661, (1995).

A.W. Adamson, Physical Chemistry of Surfaces, 4th Ed., John Wiley & Sons, New York, pp. 70–78, (1982).

D.A. Tomalia, "Dendritic Molecules", Sci. Amer., 272, pp. 62–66, (1995).

P.R. Dvornic and D.A. Tomalia, Macromol. Symp., 88, p. 123, (1994).

A. Morikawa, M. Kakimoto and Y. Imai, Macromolecules, 24, p. 3469, (1991).

A.W. van der Maade and P.W.N.M. van Leeuwen, J. Chem. Soc., Chem. Commun., p. 1400, (1992).

J.B. Lambert, J.L. Pflug and C.L. Stern, Angew. Chem. Int. Ed. Engl., 34, p. 98, (1995).

A. Sekiguchi, M. Nanjo, C. Kabuto and H. Sakurai, J. Am. Chem. Soc., 117, p. 4195, (1995).

H. Suzuki, Y. Kimata and A. Kuriyama, Chem. Lett., p. 293, (1995).

M.C. Coen, K. Lorenz, J. Kressler, H. Frey and R. Mulhaupt, Macromolecules, 29, p. 8069, (1996).

D. Seyferth et. al., Organometallics, 14, p. 5362, (1995).

J. Roovers et. al., Macromolecules, 26, p. 4324, (1993).

G.R. Newkome, C.N. Moorefield and F. Vogtle, "Dendritic Molecules", VCH Publishers, Weinheim, pp. 72–214 (1996).

D.A. Tomalia et. al., Polymer J., 17, p. 117, (1985).

S. Watanabe and S. Regen, J. Am. Chem. Soc., 116, p. 8855, (1994).

D.A. Tirrell et al., Chem. Eng. News, 12/19, p. 40, (1994).

J. Zhang and J.S. Moore, J. Am. Chem. Soc., 116, p. 2655, (1994).

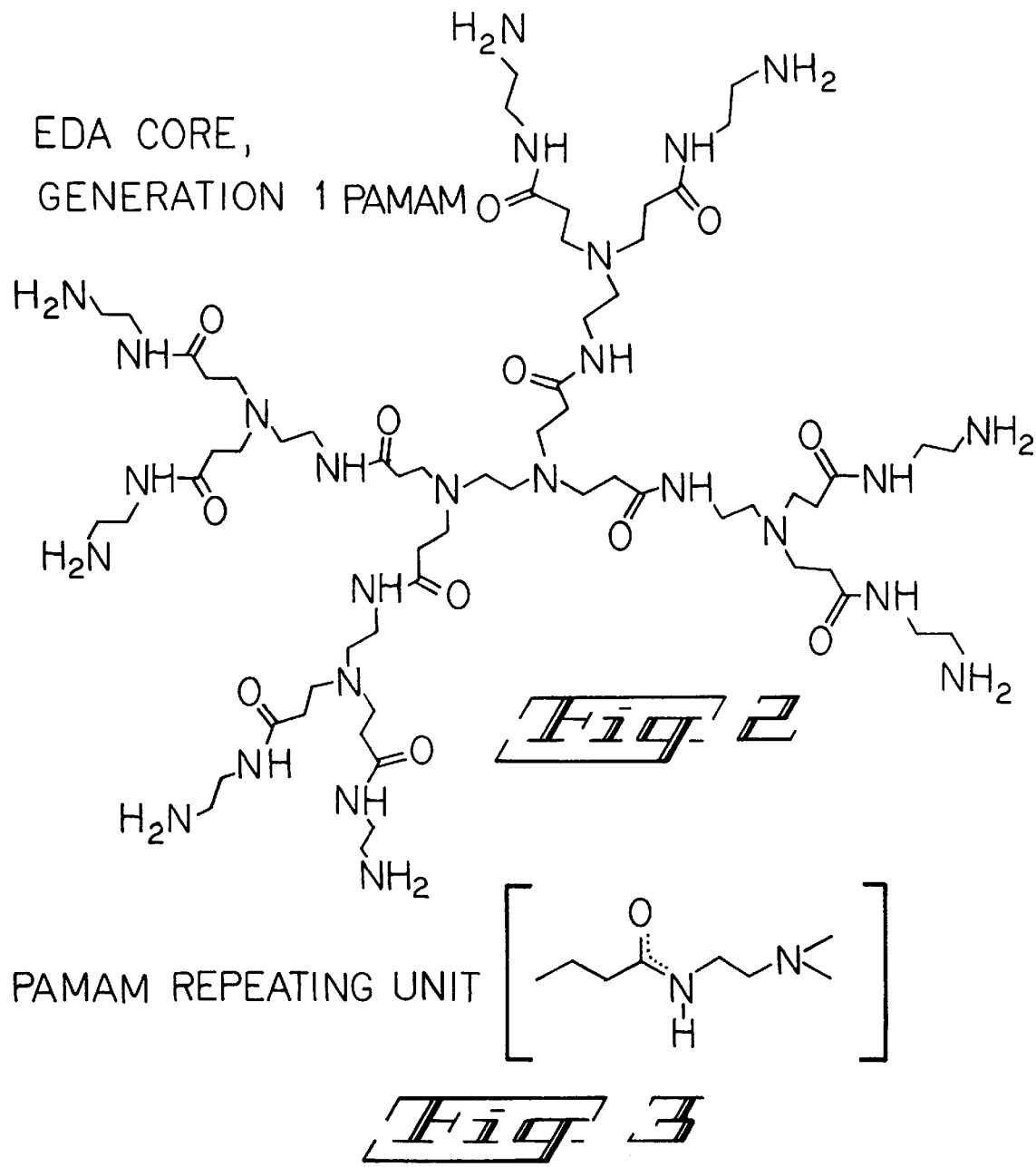

DENDRIMER-BASED NETWORKS CONTAINING LYOPHILIC ORGANOSILICON AND HYDROPHILIC POLYAMIDOAMINE NANOSCOPIC DOMAINS

CROSS-REFERENCE TO RELATED APPLICATIONS

This application is related to our prior application U.S. Ser. No. 08/867,143, filed on Jun. 2, 1997, and now U.S. Pat. No. 5,739,218, entitled "Radially Layered Copoly (amidoamine-organosilicon) Dendrimers", which prior application is assigned to the same co-owners as this present application.

BACKGROUND OF THE INVENTION

This invention is directed to dendrimer-based networks containing lyophilic organosilicon and hydrophilic polyamidoamine (PAMAM) and/or polypropyleneimine (PPI) nanoscopic domains, and more particularly to silicon-containing dendrimer-based elastomers prepared from radially layered copoly(amidoamine-organosilicon) (PAMAMOS) and/or copoly(propyleneimine-organosilicon) (PPIOS) dendrimer precursors.

During the last ten years, dendritic polymers have become one of the fastest growing areas of research interest in polymer science. There are at least two main reasons that seem responsible for this unusual amount of interest in such new polymers. First, it has been clearly realized that dendritic polymers represent a fourth main class of macromolecular architecture, which can be described as tree-like macromolecules consisting of unique branch-upon-branch-upon-branch structural organizations. Second, and based on the fundamental importance of molecular architecture for imparting macroscopic properties and behavior to polymeric materials, it is expected that these new polymers would exhibit properties that are not found in any other class of conventional polymer architecture, including linear, randomly branched, and crosslinked macromolecules.

Among the dendritic polymers, particular attention has been focused on dendrimers representing globular macromolecules having branch junctures in every repeat unit, as well as unusually precise molecular shapes, sizes, and functionality. Depending on their chemical composition, these macromolecules assume shapes from almost spherical to ellipsoidal. Such macromolecules span the lower domain of the nanoscopic size region, i.e., from about 1 to about 15 nanometer (nm) in diameter with regular increments of about 0.7 to 1.3 nm per generation. Typically, the macromolecules contain from only few to several thousand inert or reactive surface groups. Reference may be had to Table 1 below, for an example of one representative type of such a macromolecule.

TABLE 1

Molecular characteristics of ethylenediamine (EDA) core polyamidoamine (PAMAM) dendrimers

| Generation | Number of Surface Groups | MW | Hydrodynamic Radius, Å | | |
|---|---|---|---|---|---|
| | | | SEC | DSV | SANS |
| 0 | 4 | 517 | 7.6 | — | — |
| 1 | 8 | 1,430 | 10.8 | 10.1 | — |
| 2 | 16 | 3,256 | 14.3 | 14.4 | — |

TABLE 1-continued

Molecular characteristics of ethylenediamine (EDA) core polyamidoamine (PAMAM) dendrimers

| Generation | Number of Surface Groups | MW | Hydrodynamic Radius, Å | | |
|---|---|---|---|---|---|
| | | | SEC | DSV | SANS |
| 3 | 32 | 6,909 | 17.8 | 17.5 | 17.8 |
| 4 | 64 | 14,215 | 22.4 | 25.0 | 26.4 |
| 5 | 128 | 28,826 | 27.2 | 32.9 | 33.5 |
| 6 | 256 | 58,048 | 33.7 | — | 43.3 |
| 7 | 512 | 116,493 | 40.5 | — | 50.6 |
| 8 | 1024 | 233,383 | 48.5 | — | — |
| 9 | 2048 | 467,162 | 57.0 | — | 65.1 |
| 10 | 4096 | 934,720 | 67.5 | — | — |

The Hydrodynamic Radius shown in Table 1 was determined at 25° C., pH of 2.7, using 0.1 molar citric acid in water. Values are reported as obtained by using Size Exclusion Chromatography (SEC) relative to linear polyethylene oxide standards; Dilute Solution Viscometry (DSV), and Small Angle Neutron Scattering (SANS).

In addition to these characteristics, dendrimers can be obtained with almost perfect monodispersity, having weight average molecular weight/number average molecular weight ($\overline{M}_w/\overline{M}_n$) coefficients routinely below 1.02, and ranging in molecular weights from only several thousand to as high as a million or more. Hence, because of their unprecedented structural regularity and high functionality, dendrimers represent precisely defined nanoscopic building blocks available for preparation of more complex supermolecular nanoconstructions that have not been previously attainable by other synthetic means.

The first well defined, symmetrical, dendrimer family were the polyamidoamine (PAMAM) dendrimers of the general structure depicted in our FIGS. 2 and 3. In particular, FIG. 2 shows the structure of an ethylenediamine (EDA) core, Generation 1 dendrimer, and FIG. 3 shows the structure of the PAMAM repeating unit. These dendrimers are commercial products sold under the trademark STARBURST® by Dendritech, Incorporated, Midland, Mich., U.S.A.

Silicon containing dendritic polymers have gained increasing attention only recently. We are aware of reports on three different main silicon containing dendrimer families. The most widely utilized family has been the carbosilane dendrimers which have been used for various surface modifications. Their preparation was originally described in *J. Chem. Soc., Chem. Commun.*, Pages 1400–1401, (1992). Polysiloxane-based dendrimers have also been reported, but the synthetic methodology for their preparation has not been found too practical. See for example, *Dokl. Akad. Nauk. SSSR*, 309, Pages 376–380, (1989), and *Macromolecules*, Volume 24, Number 12, Pages 3469–3474, (1991). Most recently, polysilane-based dendrimers have been reported, although their syntheses have been successful only to very low generations. See for example, *Angew. Chem.* Int. Ed. Engl., 34, No. 1, Pages 98–99, (1995); *J. Am. Chem. Soc.*, Volume 117, No. 14, Pages 4195–4196, (1995); and *Chemistry Letters*, Pages 293–294, (1995).

In comparison, the uniqueness of our invention resides in the preparation of networks first from copolydendrimers having a covalently bonded hydrophilic PAMAM or PPI interior and an oleophilic hydrophobic organosilicon radially concentric outer layer. While some work has been done by others in preparing hydrophobic dendrimers with hydrophilic interiors, the prior work has not included organosilicon outer layers. See for example, *Polymer Preprints*, Volume 37, Number 2, Page 247, (1996).

Thus, our PAMAM-organosilicon layered dendrimers (PAMAMOS), in which a hydrophilic PAMAM comprises the interior, while organosilicon generations are built on top of and around it, represent the first dendrimers of this kind which can be obtained with both inert and reactive functional groups, on the outer surface of the dendrimer, including for example, groups such as $(CH_3)_3Si-$, $(CH_3O)_a (CH_3)_{3-a}Si-$, and $(CH_2=CH)_a(CH_3)_{3-a}Si-$, where a is 1, 2, or 3. Reference may be had to our prior copending application.

Accordingly, the number of reactive functional groups on the PAMAMOS or PPIOS dendrimer surface can be varied, depending upon (i) the functionality of the starting PAMAM or PPI dendrimer reactant; (ii) the completeness of its modification by the organosilicon reagent; and (iii) the functionality (Z) of the organosilicon reagent. In general, the functionality of PAMAM or PPI dendrimers is dictated by the functionality of the initiator core reagent used in their synthesis, and by generation. For example,,when ethylene diamine (EDA) is used as initiator core reagent, the functionality of the amine terminated PAMAM dendrimers ranges from 4 at generation 0 to 4096 at generation 10, doubling from every generation to the next, as shown in Table 1 above. For complete substitution, the number of functional groups of organosilicon derivatized PAMAM dendrimers (PAMAMOS) is determined by the relationship $Z=Z_{PANAM}N_b^G$, where $Z_{PANAM}$ is the number of functional groups of the starting PAMAM dendrimer; $N_b$ is the branching functionality of the organosilicon modifier used in the preparation of the PAMAMOS copolydendrimer which may be 2 or 3; and G is the number of organosilicon layers, i.e., generations around the PAMAM interior.

Up until our present invention, we are not aware of any reported work on the utilization of silicon-containing dendrimers for preparation of more complex nanoscopic products. Yet, the concept of dendrimer-based networks is gaining increasing attention. Such networks can result from establishing a three-dimensional covalent connectivity between individual dendrimers. In principle, such connectivity can be established (i) between the surfaces of two adjacent dendrimers, (ii) between one dendrimer surface and another dendrimer interior, and (iii) between interiors of two neighboring dendrimers.

Accordingly, as can be seen in FIG. 1, our invention is directed to the first of these three possible scenarios. As such, connectivity is achieved either (i.a.) by reacting two types of dendrimers having different but mutually reactive functional groups, or (i.b.) by reacting a particular dendrimer with an appropriate difunctional, trifunctional, or polyfunctional connector(s).

Both of these approaches have been demonstrated but only with pure PAMAM dendrimers. Thus, by the first approach, amine surface PAMAM dendrimers have been reacted in a classical amidation reaction with carbomethoxy surface PAMAMs, to produce higher dendrimer agglomerates. See for example, U.S. Pat. No. 4,568,737 (February 1986), U.S. Pat. No. 4,713,975 (December 1987), and U.S. Pat. No. 4,737,550 (April 1988). By using the second approach, carbomethoxy surface PAMAMs have been reacted with ethylene diamine, and amine surface PAMAM dendrimers have been treated with $K_2PtCl_4$, to prepare ordered dendritic multilayers. See for example, *Polymer Journal*, Volume 17, No. 1, Pages 117–132, (1985); and *J. Am. Chem. Soc.*, Volume 116, No. 19, Pages 8855–8856, (1994); respectively. It should be noted, however, that the products obtained were not elastomers, but rather amorphous solids at room temperature.

In addition to this, organosilicon networks described as being "somewhere in between inorganic glasses and organic elastomers", were also prepared. However, the precursors used were not dendrimers, but small molecular weight multi-functional branched compounds containing 12 alkoxysilane groups per molecule, emanating from either a single silicon atom, a linear disiloxane segment, or a ring system. See for example, M. J. Michalczyk and K. G. Sharp, *29th Organosilicon Symposium*, Evanston, Ill. (Mar. 22–23, 1996).

BRIEF SUMMARY OF THE INVENTION

This invention relates to what are believed to be the first silicon-containing dendrimer-based networks (including elastomers) prepared from radially layered copoly (amidoamine-organosilicon) (PAMAMOS) or copoly (propyleneimine-organosilicon) (PPIOS) dendrimer precursors. Since polyamidoamines and polypropyleneimines are hydrophilic moieties, the resulting products are believed to be the first silicon-containing networks (including elastomers) having covalently bonded hydrophilic and hydrophobic nanoscopic domains; the size, shape, and relative distribution of which can be precisely controlled by reagents and conditions used in the synthesis of the precursors, and by preparative conditions applied in their crosslinking into a network.

PAMAMOS precursors are obtained from PAMAM dendrimers whose surface has been partially or completely modified with functional organosilicon moieties. Related precursors can also be prepared from poly(propyleneimine) (PPI) dendrimers in the same way. Such precursors are the subject matter of our prior U.S. Pat. No. 5,739,218 referred to above.

The synthesis of such dendrimers with radially heterogeneous molecular compositions is based on different combinations of hydrophilic and hydrophobic layers. Thus, the structural units combined in these dendrimers are (a) a water soluble amidoamine repeat structure such as $-[(CH_2)_2-CO-NH-(CH_2)_2-N]=$ or a water soluble poly (propyleneimine) repeat structure such as $-[(CH_2)_3N]=$, and (b) a hydrophobic organosilicon structure.

The compositions are organized as a hydrophilic poly (amidoamine) (PAMAM) or poly(propyleneimine) (PPI) interior with a hydrophobic organosilicon exterior layer. The nature of the organosilicon layer can be varied, as well as the architectural parameters of the dendrimer structure itself, including the functionality of the core, length and functionality of the branches, and the generation of each different layer, i.e., their relative thickness.

The general structure of such dendrimers and their formation can be represented as shown below:

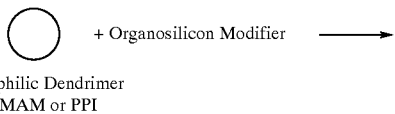

Hydrophilic Dendrimer
PAMAM or PPI

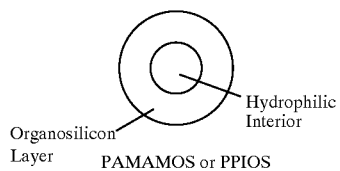

Some examples of preferred organosilicon modifiers are compounds such as (3-acryloxypropyl) methyldimethoxysilane, (3-acryloxypropyl)bis (vinyldimethylsiloxy)methylsilane, iodomethyldimethylvinylsilane, chloromethyldimethylvinylsilane, as well as other (3-acryloxypropyl)-functional silanes or other haloalkyl-functional silanes.

PAMAMOS dendrimers are functional, globular, nanoscopic macromolecules, having sizes ranging from about 1 to about 15 nm in diameter; molecular weights ranging from about 1,200 to 1,000,000; with a hydrophilic PAMAM interior encapsulated in a covalently connected lyophilic (oleophilic, hydrophobic) organosilicon outer shell. As such, they can be used for the controlled or uncontrolled preparation of what is believed to be the first PAMAM-organosilicon-containing dendritic networks, when containing reactive silicon-functional groups at the outer surface. Reference may be had to FIG. 1 of the drawing for a schematic representation of one such network according to our invention.

The reactive silicon-functional groups at the outer surface include any $(CH_3)_{3-z-y}X_zW_ySi$— moiety, where X and W represent reactive groups; z is 1, 2 or 3; and y is 0, 1, or 2. For purpose of the present invention, any reactive silicon-functional group X or W can be used, including for example, —$NH_2$, —$NR_2$mercapto (—R'SH), vinyl (—HC=$CH_2$), allyl, hydrogen, halogen, acetoxy —O(O)$CCH_3$, ureido, and alkoxy or aryloxy —OR. R represents an alkyl group containing 1–6 carbon atoms, or an aryl group such as phenyl; and R' represents the corresponding alkylene or arylene groups. The alkoxy group —OR is most preferred, however. In addition, W can be either a reactive or a non-reactive group, in which case W is preferably different from —$CH_3$ or —X.

Crosslinking of PAMAMOS or PPIOS dendrimers into dendrimer-based networks can be achieved by any number of different types of reactions, including for example:

(1) catalyzed addition reactions such as hydrosilation or thiol addition, in the case of ≡SiCH=$CH_2$, ≡Si—$CH_2$—CH=$CH_2$, ≡Si—R—SH, or ≡SiH surface functionalized dendrimers;

(2) self-catalyzed reactions such as hydrolysis with moisture or water, in the case of ≡SiCl and ≡Si—OR surface functionalized dendrimers;

(3) non-catalyzed addition reactions such as Michael addition; and (4) condensation reactions.

The crosslinking may be performed with or without one or more added reactants, such as small molecular or oligomeric (i) difunctional reagents $A_2$, (ii) trifunctional reagents $A_3$, (iii) polyfunctional reagents $A_x$ where x is 4 or more, or (iv) by simply using moisture from the atmosphere, or intentionally added water. Representative $A_2$, $A_3$, and $A_x$ reagents are for example, organohalosilanes, tetrahalosilanes, organosilanoles, organo(organooxysilanes) such as dialkoxysilanes and trialkoxysilanes, organo-H-silanes, organoaminosilanes, organoacyloxysilanes such as acetoxysilanes, organosilsesquioxanes, ureido-substituted silanes, vinyl-substituted silanes, and allyl-substituted silanes. Corresponding organic or organometallic compounds can also be employed.

Obtained elastomers are clear, highly transparent materials, exhibiting low glass temperature ($T_g$), and high thermal and thermo-oxidative stability. The exact values of these property parameters will depend of course on the PAMAM dendrimer and the organosilicon reagent used; their relative content in the resulting PAMAMOS copolydendrimer; the number of built outer organosilicon layers; and the type and relative amount of reagents $A_2$, $A_3$, and $A_x$.

The elastomers are mechanically stable, they show unique separation and swelling characteristics, and they can be obtained as thin films having non-stick surfaces. Their unique interior structure provides evenly distributed hydrophilic domains of precisely controlled nanoscopic sizes, which are covalently connected within oleophilic and elastomeric organosilicon matrix. Again, reference may be had to FIG. 1 of the present application, for a schematic representation of one such network.

This unique network architecture offers (i) new avenues in the preparation of specialty membranes; (ii) new types of protective or functional coatings; and (iii) novel routes to composites containing other organic, organometallic, or inorganic additives, such as metals, metal oxides, sulfides, or salts; that have not been available with organosilicon polymers prior to our invention. Additional applications include use of these elastomers in skin-patch delivery systems, as controlled porosity materials, as adsorbents, stationary phases for chromatographic applications, as well as for the preparation of new personal care products and agricultural products.

These and other features of our invention will become apparent from a consideration of the detailed description.

BRIEF DESCRIPTION OF THE SEVERAL VIEWS OF THE DRAWING

FIG. 2 shows the structure of a polyamidoamine dendrimer, in particular, an EDA core, Generation 1 dendrimer, used to make the PAMAMOS dendrimer-based network shown in FIG. 1.

FIG. 3 shows the structure of the PAMAM repeating unit of the EDA core, Generation 1 dendrimer, shown in FIG. 2.

DETAILED DESCRIPTION OF THE INVENTION

Figure 1:
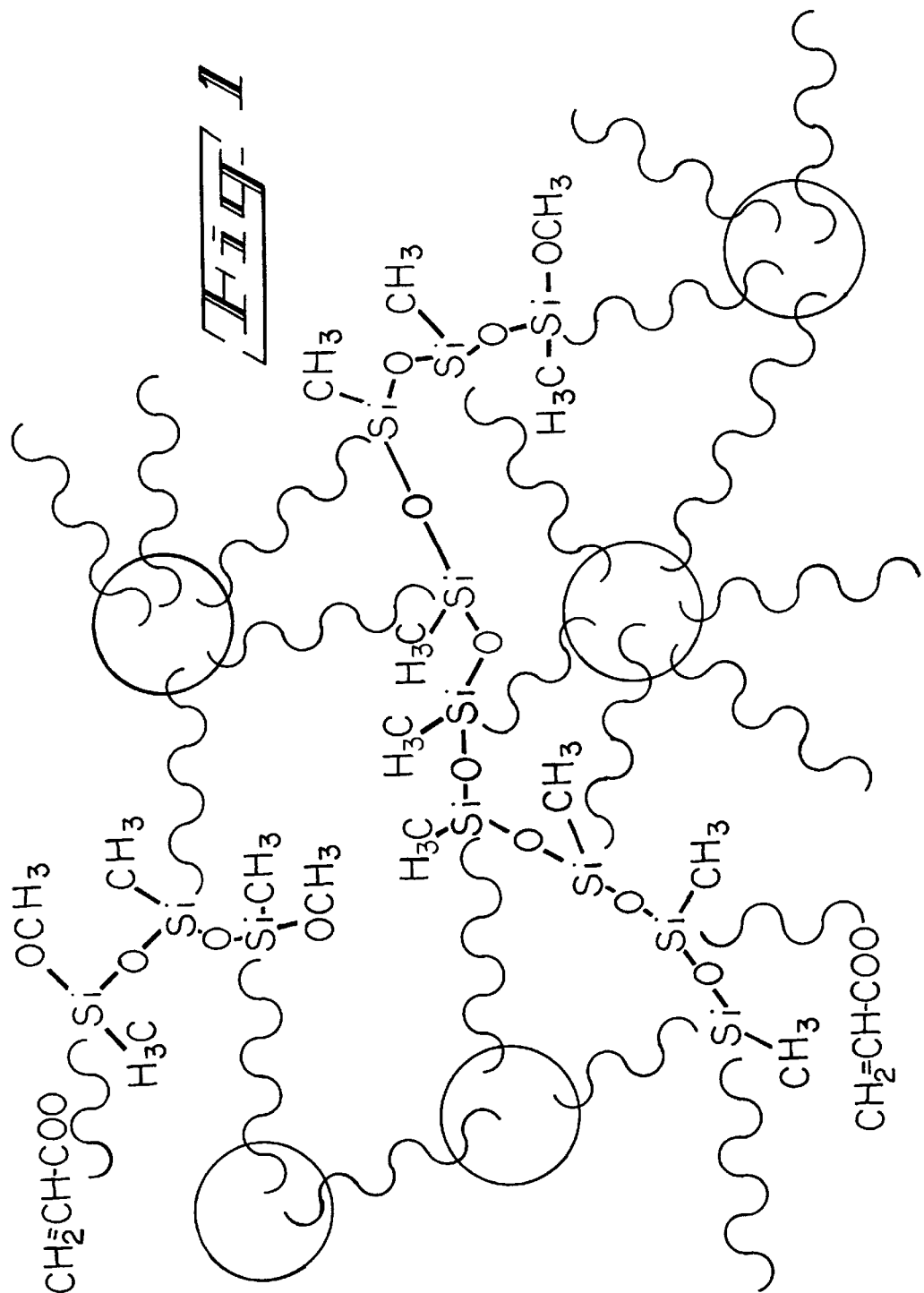
FIG. 1 is a schematic representation of a PAMAMOS dendrimer-based network where circles represent PAMAMOS or PPIOS dendrimers.

This invention is believed to represent the first example of successful preparation of dendrimer-based networks from radially layered copolydendrimers having dramatically different intra-molecular composition, i.e., their surfaces and their interiors. The resulting network product contains well defined, covalently bonded, and dramatically different domains including hydrophilic and hydrophobic regions distributed throughout its bulk. Additionally, the size and shape of the hydrophilic domains can be precisely controlled by selection of an appropriate PAMAM or PPI dendrimer generation used for copolydendrimer precursor preparation. For example, reference may be had to FIG. 2 and to Table 1, for one appropriate type of PAMAM dendrimers. In general, however, the hydrophilic dendrimer can be a generation 0 to generation 10 polyamidoamine dendrimer, or a generation 0 to generation 5 polypropyleneimine dendrimer. The molecular weight of the hydrophilic dendrimer can range from about 350 to over about 1,000,000.

The hydrophobic domain, on the other hand, can be tailored by control of the chemical composition and thickness of the organosilicon layer formed on the hydrophilic PAMAM or PPI interior. Therefore, since one can control the size and shape of both of the network domains, one can also predesign properties for the resulting network. For example, to prepare a network wherein all domains of the network are equal in size and shape, a single PAMAMOS or PPIOS copolydendrimer precursor is used in the crosslinking reaction. If, however, a specific distribution pattern of relative sizes and shapes of the domains is desirable, then mixtures of different PAMAMOS, or PPIOS, or combinations of the two, prepared from different generation PAMAM or PPI dendrimers having different thickness of organosilicon surface shells, are used in the preparation.

Radially layered dendrimer based networks prepared from PAMAMOS or PPIOS copolydendrimers such as those described in this present application, and in our prior U.S. Pat. No. 5,739,218, have unique combinations of hydrophilic/hydrophobic properties, depending on the relative size and shape of their respective domains. As explained above, their nanostructure can be adjusted. In addition, radially layered dendrimer based networks having tailored semipermeability, tailored swelling and diffusion behavior, tailored surface and mechanical properties, tailored glass temperature, and tailored insulating, and optical, characteristics, can be provided according to the concepts of our invention.

These networks find practical application in elastomeric coatings for material science and electronics; biomolecular and biomedical engineering; liquid crystal engineering; molecular devices capable of information storage; separation processes; membrane reactor design; organo-inorganic composites; skin-patch delivery systems; controlled porosity materials; adsorbents; delivery systems; coloring of silicone elastomers; stationary phases for chromatography; personal care; agricultural products; and as components of electrical, electronic, optical, opto-electronic, and data storage devices.

In preparing dendrimer-based networks from radially layered copoly(amidoamine-organosilicon) (PAMAMOS) or copoly(propyleneimine-organosilicon) PPIOS dendrimer precursors, the structural composition of the dendrimer can be varied so as to result in different mass and size ratios of the two compositions. Thus, the size of the hydrophilic polyamidoamine or polypropyleneimine domain is predefined by selecting an appropriate PAMAM or PPI dendrimer for use in the precursor preparation. The relative mass ratio and size of the organosilicon domains is predefined by the number and structure of the organosilicon layer around the PAMAM or PPI core in the radially layered PAMAMOS or PPIOS copolydendrimer precursor, and by the number and type of crosslinking reagent, if a crosslinking agent or agents are employed.

Organosilicon compounds that can be reacted to form the dendrimer, i.e., the organosilicon modifier, are compounds such as (3-acryloxypropyl)methyldimethoxysilane, (3-acryloxypropyl)bis(vinyldimethylsiloxy)methylsilane, iodomethyldimethylvinylsilane, chloromethyldimethylvinylsilane, as well as other (3-acryloxypropyl)-functional silanes or haloalkyl-functional silanes.

The type of reactive surface group of the PAMAMOS or PPIOS copolydendrimer precursor which participates in the network forming crosslinking is defined in the last stages of the precursor preparation. In the examples which follow, although the surface group used is $\equiv$Si—OCH$_3$, other surface groups can also be employed, such as different $\equiv$Si—OR groups, $\equiv$Si -halogen, $\equiv$Si—NH$_2$, $\equiv$Si—NR$_2$, $\equiv$Si—H, $\equiv$Si -Vinyl, $\equiv$Si -Allyl, $\equiv$Si—R—SH, $\equiv$Si—O(O)CCH$_3$, or $\equiv$Si—NH(O)CNH$_2$ ($\equiv$Si-Ureido). The type and the extent of the crosslinking obtained will depend upon the type of the dendrimer surface group which is selected. In the examples set forth below, crosslinking is obtained by the controlled or uncontrolled hydrolysis of PAMAMOS dendrimer precursors having $\equiv$Si—OCH$_3$ surface groups, using either water or atmospheric moisture.

Examples of specific crosslinking agents that can be used to react with the dendrimer are small molecular or oligomeric (i) difunctional reagents $A_2$, (ii) trifunctional reagents $A_3$, or (iii) polyfunctional reagents $A_x$ where x is 4 or more. Representative $A_2$, $A_3$, and $A_x$ reagents are organohalosilanes, tetrahalosilanes, organo (organooxysilanes) such as dialkoxysilanes and trialkoxysilanes, organo-H-silanes, organoaminosilanes, organoacyloxysilanes such as acetoxysilanes, organosilsesquioxanes, vinyl-substituted silanes, allyl-substituted silanes, and corresponding organic or organometallic compounds.

Thus, the following examples are set forth in order to illustrate and to describe in more detail the method according to our invention for the preparation of dendrimer-based networks. The method is not solvent specific, and among suitable solvents for preparing the radially layered copolydendrimer precursors are methanol, N,N-dimethylformamide, tetrahydrofuran, dimethylacetamide, dimethylsulfoxide, N-methyl-2-pyrrolidone, hexamethylphosphoramide, chloroform, methylene chloride, and tetramethylurea.

Preliminary characterization data is included in the examples.

Example 1

Modification of generation 3 (E3) EDA core PAMAM dendrimer with (3-acryloxypropyl) dimethoxymethylsilane All glassware used in this synthesis was first dried overnight in a heating oven and then assembled while still hot. A three-necked round bottomed flask was equipped with a nitrogen inlet, a stopper, and a condenser with another stopper at its top; evacuated to a partial vacuum; and flame-dried using several nitrogen-vacuum purging cycles. After the assembled glassware was cooled back to room temperature (20–25° C./68–77° F.), the apparatus was filled with nitrogen predried by passing it over DRIERITE®, the stopper on the flask was removed under a strong counterstream of dry-nitrogen, and replaced by a rubber septum. A rubber balloon was placed on the top of the condenser to allow control of slight over pressures in the assembly. Syringes were also dried overnight in the oven, and kept in a desiccator until used. The dendrimer was lyophilized under high vacuum overnight in a round-bottomed flask, then weighted (1.46 g; 0.21 mmol; 13.57 mmol of —NH groups), placed under dry-nitrogen, and the flask was equipped with a rubber-septum. Anhydrous methanol (14 mL) was added via a syringe through the septum. When all of the dendrimer was dissolved, the mixture was transferred with a syringe to the apparatus. To the apparatus was added an entire amount of (3-acryloxypropyl)dimethoxymethylsilane (3.8 mL; 16.09 mmol; 1.2 mmol excess based on —NH groups), and the mixture was left at room temperature, with stirring, under nitrogen atmosphere, for about 24 hours. The percent of modification was determined by $^1$H Nuclear Magnetic Resonance (NMR) of the crude sample. For this determination, about 1 mL of the sample was removed from the reaction mixture with a syringe, and introduced in a two-necked round bottomed flask equipped with a septum and a nitrogen inlet. Methanol was evaporated under vacuum, and replaced with 0.7 mL of deuterated chloroform $CDCl_3$. The modified dendrimer was stable as long as it was kept in an anhydrous solution. Analytical results using $^1$H NMR in $CDCl_3$ were as follows: 0.02 ppm (s; ≡Si—C$\underline{H}_3$); 0.52 ppm (m; —C$\underline{H}_2$—Si≡); 1.61 ppm (m; —COO—CH$_2$—C$\underline{H}_2$—CH$_2$—Si≡); 2.4–3.6 ppm (PAMAM dendrimer protons); 3.40 ppm (s; ≡Si—O—C$\underline{H}_3$); 3.94 ppm (t; PAMAM-COO—C$\underline{H}_2$—); 4.02 ppm (t, CH$_2$=CH—COO—C$\underline{H}_2$—); 5.68–6.32 ppm (d +dxd +d; C$\underline{H}_2$=CH—COO—). Analytical results using $^{13}$C NMR in $\overline{CDCl_3}$ for the modified dendrimer were as follows: -6.18 ppm (≡Si—$\underline{CH}_{3,3}$); 8.89 ppm (—$\underline{CH}_2$—Si ≡); 21.82 ppm (—$\overline{CO}$—CH$_2$—CH$_2$CH$_2$—Si≡); 32.37 ppm (=N—CH$_2$—$\overline{CH}_2$—COO—(CH$_2$)$_3$—Si≡); 33.54 ppm (-CH$_2$-CO-NH-); $\overline{34.75}$ ppm (—NH—CH$_2$—CH$_2$—COO—(CH$_2$)$_3$—Si≡); 37.10 and 37.29 ppm (—$\underline{CO}$—NH—CH$_2$—); 38.76 ppm (—CO—NH—$\underline{CH}_2$—CH$_2$—NH—(CH$_2$)$_2$—COO—); 44.43 ppm (—CO—NH—CH$_2$—CH$_2$—NH—(CH$_2$)$_2$—COO—); 48.37 ppm (—NH—$\overline{CH}_2$—CH$_2$—COO—(CH$_2$)$_3$—Si≡); 48.92 ppm (—CO—$\overline{NH}$—CH$_2$—CH$_2$—N—((CH$_2$)$_2$—COO—)$_2$); 49.54 ppm (—CO—NH—$\overline{CH}_2$—CH$_2$—N=); 49.89 ppm (≡Si—O—CH$_3$); 51.33 ppm (=$\overline{N}$—$\underline{CH}_2$ CH$_2$—COO—) ; 52.20 and $\overline{52.60}$ ppm (=N—CH$_2$—$\overline{CH}_2$—CONH—); 66.31 ppm (=N—(CH$_2$)$_2$—CO$\overline{O}$—$\underline{CH}_2$—); 128.32 and 130.18 ppm (CH$_2$=CH—); 172.21 and $\overline{1}$72.31 ppm (—CH$_2$—CH$_2$—$\overline{COO}$— and —$\underline{C}$O—NH—) and unreacted acrylate reagent: -6.18 ppm (≡Si—CH$_3$); 8.89 ppm (—$\underline{CH}_2$—Si≡); 21.82 ppm (—COO—$\overline{CH}_2$—$\underline{CH}_2$—CH $_2$—$\overline{Si}$≡); 49.89 ppm (≡Si—O—CH$_3$); 66.3$\overline{6}$ ppm (CH$_2$=CH—COO—$\underline{CH}_2$); 128.32 and $\overline{130}$.18 ppm ($\underline{CH}_2$=$\underline{CH}$—); and 165.92 ppm ($\underline{CH}_2$=CH—$\underline{C}$OO—).

Example 2

Preparation of a dendrimer-based network from a PAMAM-organosilicon copolydendrimer containing on average 84.5≡Si—OCH$_3$surface groups A PAMAM-organosilicon copolydendrimer precursor having on average 84.5 reactive methoxy end-groups on its surface, was synthesized by following the procedure described in Example 1, during 24 hours of reaction time. 1 mL of the reaction mixture containing 0.015 mmol of dendrimer and 0.5 mmol of (3-acryloxypropyl) dimethoxymethylsilane in 1 mL of methanol was poured in an aluminum pan, covered with an aluminum foil, and left exposed to room atmosphere without any additional precautions. In contact with moisture from air, and catalyzed by the basic PAMAM interior, the cure slowly took place, accompanied by the slow liberation and evaporation of methanol by-product. The pan was weighted from time to time. After 5 days, the resulting product was obtained in the form of a perfectly clear, transparent colorless film. It was not soluble in methanol, methylene chloride, tetrahydrofuran (THF), acetone, or water. This was determined by attempted solubilization of about 5 mg of the product in 5 mL of a solvent for 1 month.

The thermal properties of the film were examined by differential scanning calorimetry (DSC), and thermal gravimetric analysis (TGA), in nitrogen and in air. DSC was performed from -65° C. to +100° C. at a heating rate of 10°/min. TGA was performed from room temperature to 1,000° C. at a heating rate of 20°/min. The glass temperature $T_g$ was found at -7° C. In nitrogen, samples were stable until 175° C., above which was observed a two-step weight loss process. The first step started at 175° C. and ended at 355° C. The sample lost about 40% of its original weight, with the maximum rate of this loss found at 320° C. The second step started at 355° C. and continued until 600° C. The total weight lost was about 48% of the original weight, with the maximum rate of this loss appearing at 390° C. In air, the degradation was in a three-step process. The first step started at 180° C., showed maximum rate of weight loss at 300° C., and ended at 350° C., resulting in a total weight loss of about 21% of the original weight. The second step started at 350° C., showed maximum rate of weight loss at 400° C., and ended at 565° C., after the total weight loss was 35% of the original sample weight. The final third degradation step started at 565° C., showed maximum rate of weight loss at 655° C., and ended at 780° C., with the total weight loss of 20% of the original sample weight.

Figure 4:
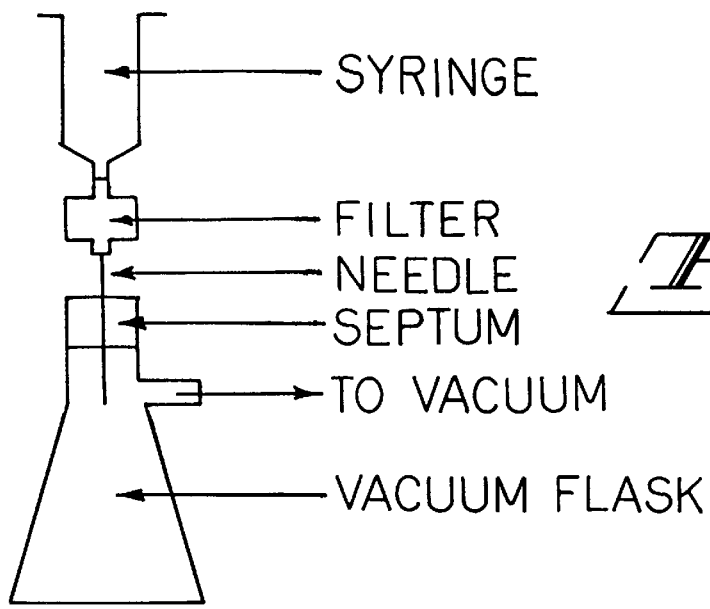
FIG. 4 is a pictorial representation of the apparatus used for testing of the permeability of PAMAMOS dendrimer-based networks.
Figure 5:
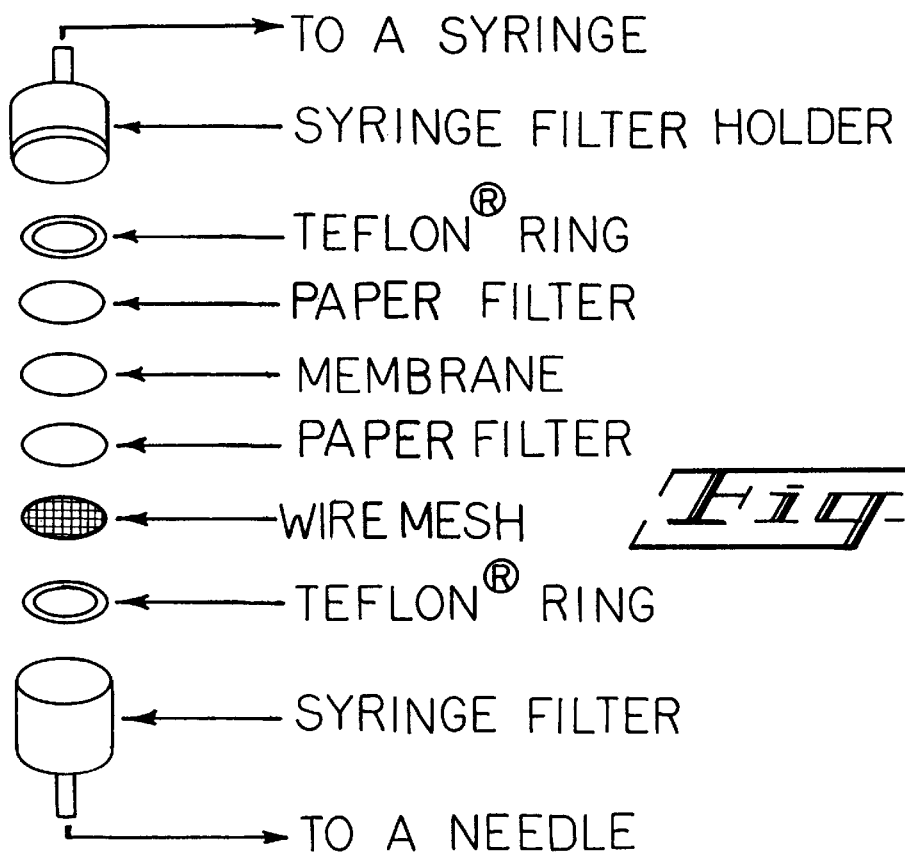
FIG. 5 is a pictorial representation, in more detail, of the syringe filter of the apparatus shown in FIG. 4.

The permeability of the film to water was examined using a syringe filtration apparatus as depicted in FIGS. 4 and 5 of our drawing. Such apparatus is well known in the art, and typically comprises a VACUUM FLASK for supporting the SYRINGE FILTER. The FILTER includes a MEMBRANE sandwiched between PAPER FILTERS and supported on a stainless steel WIRE MESH. Communication between the SYRINGE FILTER and the VACUUM FLASK is established by passing the NEEDLE of the SYRINGE FILTER through a SEPTUM on the VACUUM FLASK.

The rate of decrease of the meniscus of 20 mL of water in the SYRINGE was followed as a function of time. When the partial VACUUM applied to the VACUUM FLASK was 0.3 mm Hg, the flow rate of pure water through the MEMBRANE contained in the FILTER was 2 mL/min, as compared to 2.5 mL/min through the same apparatus when the MEMBRANE was absent.

Permselectivity of the film was tested with NaCl solution in deionized water, also using the apparatus depicted in FIGS. 4 and 5. The NaCl solution used was prepared from 5.8478 gram of NaCl dissolved in 1 liter of deionized water. A concentration of 0.10006 mol/L was determined by titrating 5 mL of this solution in 50 mL of water with 0.1N solution of silver nitrate. The silver nitrate solution was prepared by dissolving 17.0174 gram of silver nitrate in 1L of deionized water to provide a concentration of 0.10017 mol/L, in the presence of dextrin (5 mL of 2% by weight of dextrin in water) and 5 drops of 0.2% by weight sodium fluorescein solution in water as indicator. In making a determination for permselectivity, first NaCl solution was run through the apparatus without the MEMBRANE, and the total volume collected and NaCl content were determined. Two runs were performed providing quantitative volumes of solutions collected. In each case, after the entire volume of each solution had passed through the FILTER in FIG. 4, the apparatus was rinsed three times with a total of 45 mL of deionized water. To the joint filtrate and rinse, 5 mL of dextrin solution, and 5 drops of fluorescein indicator were added, and NaCl was titrated as above described. Following this procedure, the same two tests were performed through the cured dendrimer-based film when it was installed as the MEMBRANE shown in FIG. 5. In both cases, it was found that the flow of NaCl was quantitative, and that the film was completely permeable to NaCl. In both cases, the film was intact after completion of the tests.

Another test for permselectivity was performed with a solution of methylene blue in water, at a concentration of $2.71 \times 10^{-3}$ mol/L. It was observed that initially, a few blue drops of methylene blue went through the cured dendrimer-based film used as the MEMBRANE, but then the MEMBRANE became completely impermeable to methylene blue.

Example 3

Preparation of an elastomeric dendrimer-based network from a PAMAM-organosilicon copolydendrimer containing on average 91.5≡Si—OCH₃ surface groups The procedure for this preparation was the same as that described in Example 2, except that the modification of the PAMAM dendrimer was allowed to continue for 48 hours. As a result, the obtained modified dendrimer had on an average 91.5≡Si—OCH₃ end groups per molecule. The obtained elastomeric film had $T_g$ of $-20°$ C. as determined by DSC. The obtained elastomeric film also had high temperature properties described hereinafter. In nitrogen, a two-step degradation process started at 180° C.; the first step of which lasted until about 340° C. showing a maximum rate of weight loss at 320° C., with a total weight loss about 40% of the original sample weight. The second step started at 340° C., lasted until 500° C., had a maximum rate of weight loss at about 390° C., and an overall weight loss of about 45 of the original sample weight. In air, the three-step degradation process had the following characteristics. The first step started at 175° C., had a maximum rate of weight loss at 300° C., and a total weight loss of 22% of the original sample weight. The second step started at 340° C., lasted until 560° C., had a maximum rate of weight loss at 430° C., and the total weight loss was 38% of the original weight.

The third step started at 560° C., lasted until 800° C., had a maximum rate of weight loss at 657° C., and the total loss was 22% of the original sample weight. The permeability of the film toward water when used as MEMBRANE in the apparatus shown in FIGS. 4 and 5, was estimated at about 0.008 mL/min, using a partial VACUUM of about 0.3 mm Hg.

Example 4

Preparation of an elastomeric dendrimer-based network from a PAMAM-organosilicon copolydendrimer containing on average 96≡Si—OCH₃ surface groups The procedure for this preparation was the same as that described in Examples 2 and 3, except that the modification of the dendrimer was allowed to continue for 71 hours of the total reaction time, resulting in an obtained modified dendrimer having on average 96≡Si—OCH₃ surface groups per molecule. The $T_g$ of the obtained elastomeric film was $-18°$ C. as determined by DSC. Its thermal and thermo-oxidative stability were similar to that described for the elastomeric film of Example 3. The permeability of the film toward water was about 0.004 mL/min, using the apparatus depicted in FIGS. 4 and 5, under partial vacuum of about 0.3 mm Hg.

Our elastomeric dendrimer-based networks can be compounded with additives normally employed in silicone elastomers including fillers such as fused silica, carbon black, and glass microballons; catalysts such as tin carboxylates and titanate esters; pigments; plasticizers; adhesion promoters; fungicides; flame retardants; thickeners; chain extenders; vulcanizing agents; and antioxidants.

In addition, the networks provide an avenue for introducing various inorganic components into silicone rubbers. For example, this can be accomplished by molecular encapsulation of inorganic additives such as metals, metal oxides, sulfides, and/or metal salts, into the PAMAM interior, prior to formation of its organosilicon exterior, or by diffusion after the network has formed.

Other variations may be made in compounds, compositions, and methods described herein, without departing from the essential features of our invention. The forms of invention are exemplary only, and not intended as limitations on their scope as defined in the appended claims.

We claim:

1. A composition comprising a dendrimer-based network having hydrophilic and hydrophobic nanoscopic domains, comprising a crosslinked product of a radially layered copolydendrimer having a hydrophilic interior, and a hydrophobic organosilicon exterior terminated with reactive end groups, the copolydendrimer being prepared by reacting a hydrophilic dendrimer having —NH₂ surface groups, with an organosilicon compound, in the presence of a solvent.

2. A composition according to claim 1 in which the reactive end groups of the copolydendrimer are hydrolyzable groups, and the copolydendrimer is crosslinked to form a dendrimer-based network having hydrophilic and hydrophobic nanoscopic domains, by exposing the copolydendrimer to atmospheric moisture or by contacting the copolydendrimer with water.

3. A composition according to claim 1 in which the copolydendrimer is crosslinked by contacting the copolydendrimer with a crosslinking agent selected from the group consisting of low molecular weight or oligomeric (i) difunctional reagents, (ii) trifunctional reagents, and (iii) polyfunctional reagents.

4. A composition according to claim 3 in which crosslinking agent is selected from the group consisting of organohalosilanes, tetrahalosilanes, organosilanoles, organo (organooxy)silanes, organo-H-silanes, organoaminosilanes, organoacyloxysilanes, organosilsesquioxanes, ureido-substituted silanes, vinyl-substituted silanes, and allyl-substituted silanes; and the hydrophilic interior of the copolydendrimer is selected from the group consisting of polyamidoamine and polypropyleneimine.

5. A composition according to claim 1 in which the reactive end groups on the hydrophobic organosilicon exterior of the copolydendrimer are moieties conforming to the formula $(CH_3)_{3-z-y}X_zW_ySi—$, wherein X represents the reactive end group; W is a reactive or non-reactive group different from —CH₃ or —X; y is 0, 1, or 2; z is 1, 2 or 3; and z+y is 1, 2, or 3.

6. A composition according to claim 5 in which the reactive end group X is selected from the group consisting of —NH₂, —NR₂, —R'SH, —HC═CH₂, —CH₂—CH═CH₂, hydrogen, halogen, —O(O)CCH₃, —NH(O)CNH₂, alkoxy, and aryloxy; wherein R represents an alkyl group containing 1–6 carbon atoms or an aryl group; and R' represents an alkylene group containing 1–6 carbon atoms or an arylene group; and the hydrophilic interior of the copolydendrimer is selected from the group consisting of polyamidoamine and polypropyleneimine.

7. A composition according to claim 1 in which more than one copolydendrimer is crosslinked to form the dendrimer-based network having hydrophilic and hydrophobic domains.

8. A composition according to claim 7 in which the copolydendrimers have different generations of polyamidoamine or polypropyleneimine dendrimers in their interior surrounded by organosilicon exteriors of different thickness.

9. A composition according to claim 1 in which the dendrimer-based network is an elastomer having a glass transition temperature $T_g$ of −15° C. or less.

10. A composition according to claim 9 in which the dendrimer-based elastomeric network is optically clear, transparent, colorless, or has a non-stick surface.

11. A composition according to claim 1 in which the dendrimer-based network has a glass transition temperature $T_g$ of −15° C. or more.

12. A composition according to claim 11 in which the dendrimer-based network is optically clear, transparent, colorless, or has a non-stick surface.

13. A composition according to claim 1 in which the organosilicon compound is a (3-acryloxypropyl)-functional silane or a haloalkyl-functional silane.

14. A composition according to claim 13 in which the organosilicon compound is
(3-acryloxypropyl)methyldimethoxysilane,
(3-acryloxypropyl)bis(vinyldimethylsiloxy)methylsilane,
iodomethyldimethylvinylsilane, or
chloromethyldimethylvinylsilane.

15. A composition according to claim 1 in which the hydrophilic dendrimer is a generation 0 to generation 10 polyamidoamine dendrimer, or a generation 0 to generation 5 polypropyleneimine dendrimer.

16. A composition according to claim 15 in which the hydrophilic dendrimer has from about 3 to about 4100 surface groups.

17. A composition according to claim 16 in which the molecular weight of the hydrophilic dendrimer is from about 350 to over about 1,000,000.

18. A composition according to claim 17 in which the molecular diameter of the hydrophilic dendrimer ranges from about 10 to about 150 Å.

19. A composition according to claim 1 wherein the solvent for preparing the radially layered copolydendrimer is selected from the group consisting of methanol, N,N-dimethylformamide, tetrahydrofuran, dimethylacetamide, dimethylsulfoxide, N-methyl-2-pyrrolidone, hexamethylphosphoramide, chloroform, methylene chloride, and tetramethylurea.

* * * * *